United States Patent
Shinbata (10) Patent No.: US 7,916,923 B2
(45) Date of Patent: Mar. 29, 2011

(54) MEDICAL IMAGE FORMING METHOD AND APPARATUS WITH GRAYSCALE CONVERSION PROCESSING

(75) Inventor: Hiroyuki Shinbata, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 811 days.

(21) Appl. No.: 10/838,996

(22) Filed: May 4, 2004

(65) Prior Publication Data

US 2004/0223635 A1     Nov. 11, 2004

(30) Foreign Application Priority Data

May 7, 2003   (JP) ................................ 2003-129450

(51) Int. Cl.
*G06K 9/00* (2006.01)
(52) U.S. Cl. ...................... 382/133; 382/132; 382/254
(58) Field of Classification Search ................. 382/128, 382/132, 133, 254
See application file for complete search history.

(56) References Cited

U.S. PATENT DOCUMENTS

| | | | | |
|---|---|---|---|---|
| 4,390,948 A * | 6/1983 | Mori et al. | ................... | 701/201 |
| 5,850,465 A * | 12/1998 | Shimura et al. | ............... | 382/132 |
| 5,970,164 A * | 10/1999 | Bamberger et al. | ........... | 382/128 |
| 6,307,914 B1 * | 10/2001 | Kunieda et al. | ................. | 378/65 |
| 2002/0018590 A1 * | 2/2002 | Shinbata | ....................... | 382/132 |
| 2004/0058340 A1 * | 3/2004 | Dai et al. | .......................... | 435/6 |
| 2004/0138559 A1 * | 7/2004 | Cheng et al. | .................. | 600/437 |

FOREIGN PATENT DOCUMENTS

| | | |
|---|---|---|
| JP | 07-271972 A | 10/1995 |
| JP | 09-238933 A | 9/1997 |
| JP | 2000-276605 | 10/2000 |
| JP | 2001-223946 A | 8/2001 |

OTHER PUBLICATIONS

The above references were cited in a Oct. 2, 2009 Japanese Office Action that issued in Japanese Patent Application No. 2003-129450, which is enclosed without English Translation.

* cited by examiner

*Primary Examiner* — Vikkram Bali
*Assistant Examiner* — Eueng-Nan Yeh
(74) *Attorney, Agent, or Firm* — Cowan, Liebowitz & Latman, P.C.

(57) ABSTRACT

In an image forming apparatus, an isolated shadow is extracted from image data, and a feature amount is calculated from the extracted isolated shadow. The grayscale conversion characteristic is changed on the basis of the calculated feature amount. Grayscale conversion of the image data is executed on the basis of the changed grayscale conversion characteristic.

10 Claims, 8 Drawing Sheets

MEDICAL IMAGE FORMING METHOD AND APPARATUS WITH GRAYSCALE CONVERSION PROCESSING

FIELD OF THE INVENTION

The present invention relates to a diagnosis support method and apparatus and, more particularly, to a diagnosis support method and apparatus which extract a pathological feature portion from an image and present it.

BACKGROUND OF THE INVENTION

With recent advances in digital technology, a radiographic image is converted into a digital image signal, which is displayed on a CRT or the like or printed out on a film upon being subjected to image processing (see, for example, Japanese Patent Application No. 11-076881). In addition, recently, a diagnosis support apparatus which automatically extracts a tumor shadow or the like from a radiographic image has been developed. An image containing the tumor shadow or the like extracted by the diagnosis support apparatus is often displayed on a film or CRT.

However, an extracted tumor shadow is not always displayed at proper contrast on a film or CRT. This may make it difficult to diagnose an extracted tumor shadow or the like. In a chest frontal image, for example, a tumor shadow located in the mediastinum or near the periphery of the lung field cannot be presented at proper contrast. This may cause a problem in a medical examination.

In general, in such a case, when a tumor shadow is displayed on a CRT, the tone curve of the CRT is manually changed to suite for a medical examination of the tumor shadow. Furthermore, even if a tumor shadow has been automatically extracted, it may be overlooked because of the difficulty in making observation on the CRT.

When an image containing a tumor shadow is printed on a film, the density of the printed film cannot be changed. This makes it necessary to change the density again and print an image on a film again. This situation poses many problems in terms of operation efficiency and effective use of resources.

SUMMARY OF THE INVENTION

The present invention has been made to solve the above problems, and has as its object to present a tumor shadow or the like extracted from an image at a proper density and contrast and provide an image which allows easy diagnosis.

In order to achieve the above object, an image forming apparatus according to the present invention has the following arrangement. That is, an image forming apparatus comprises: an extraction unit configured to extract an isolated shadow from image data; a first calculation unit configured to calculate a feature amount from the extracted isolated shadow; a changing unit configured to change a grayscale conversion characteristic on the basis of the feature amount calculated by the first calculation unit; and a conversion unit configured to execute grayscale conversion of the image data on the basis of the grayscale conversion characteristic changed by the changing unit.

In order to achieve the above object, an image forming method according to the present invention, comprises an extraction step of extracting an isolated shadow from image data; a first calculation step of calculating a feature amount from the extracted isolated shadow; a changing step of changing a grayscale conversion characteristic on the basis of the feature amount calculated in the first calculation step; and a conversion step of executing grayscale conversion of the image data on the basis of the grayscale conversion characteristic changed in the changing step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
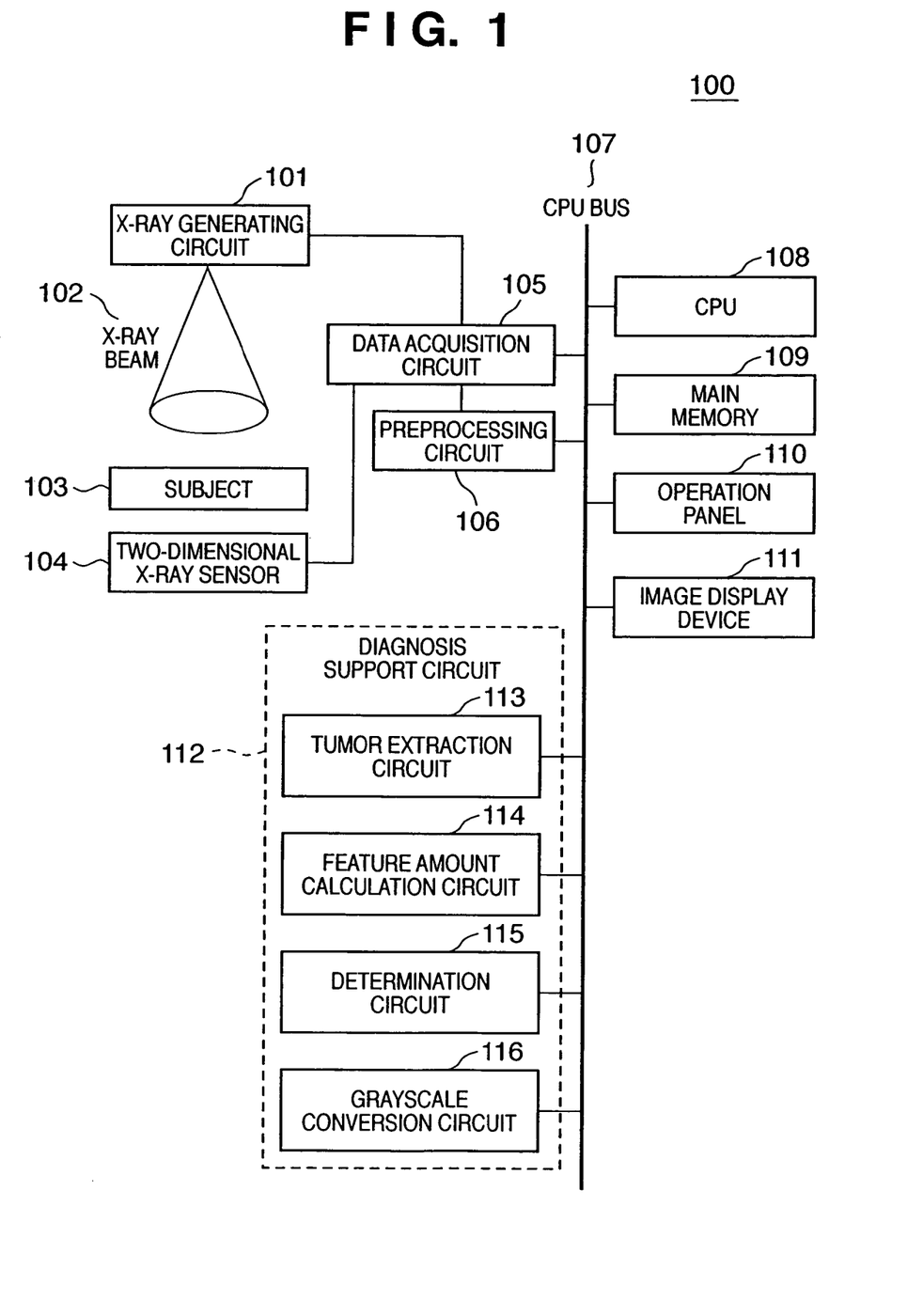
FIG. 1 is a block diagram showing the arrangement of an image processing apparatus according to the first embodiment.

FIG. 1 is a block diagram showing the arrangement of X-ray imaging device 100 according to the first embodiment. As shown in FIG. 1, the X-ray imaging device 100 has a diagnosis support function, and includes a preprocessing circuit 106, CPU 108, main memory 109, operation panel 110, image display device 111, and diagnosis support circuit 112. These components exchange data through a CPU bus 107.

The diagnosis support circuit 112 includes a tumor extraction circuit 113, feature amount calculation circuit 114, determination circuit 115, and grayscale conversion circuit 116. The tumor extraction circuit 113 extracts an isolated shadow such as a tumor region (shadows as a whole will be referred to as "isolated shadows" regardless whether they are benign or malignant) from an image. The feature amount calculation circuit 114 calculates a feature amount for grayscale conversion from the isolated shadow extracted by the tumor extraction circuit 113. The determination circuit 115 determines whether the isolated shadow extracted by the tumor extraction circuit 113 includes a plurality of regions, and then determines the tumor likelihood of the extracted isolated shadow region. The grayscale conversion circuit 116 converts an image value into a density (luminance) signal for output operation. In the following description, an image value is converted into an density value, assuming a case wherein an image is output to a film or the like. When, however, an image is to be output to a CRT or the like, it suffices if "density" is replaced with "luminance".

Figure 3:
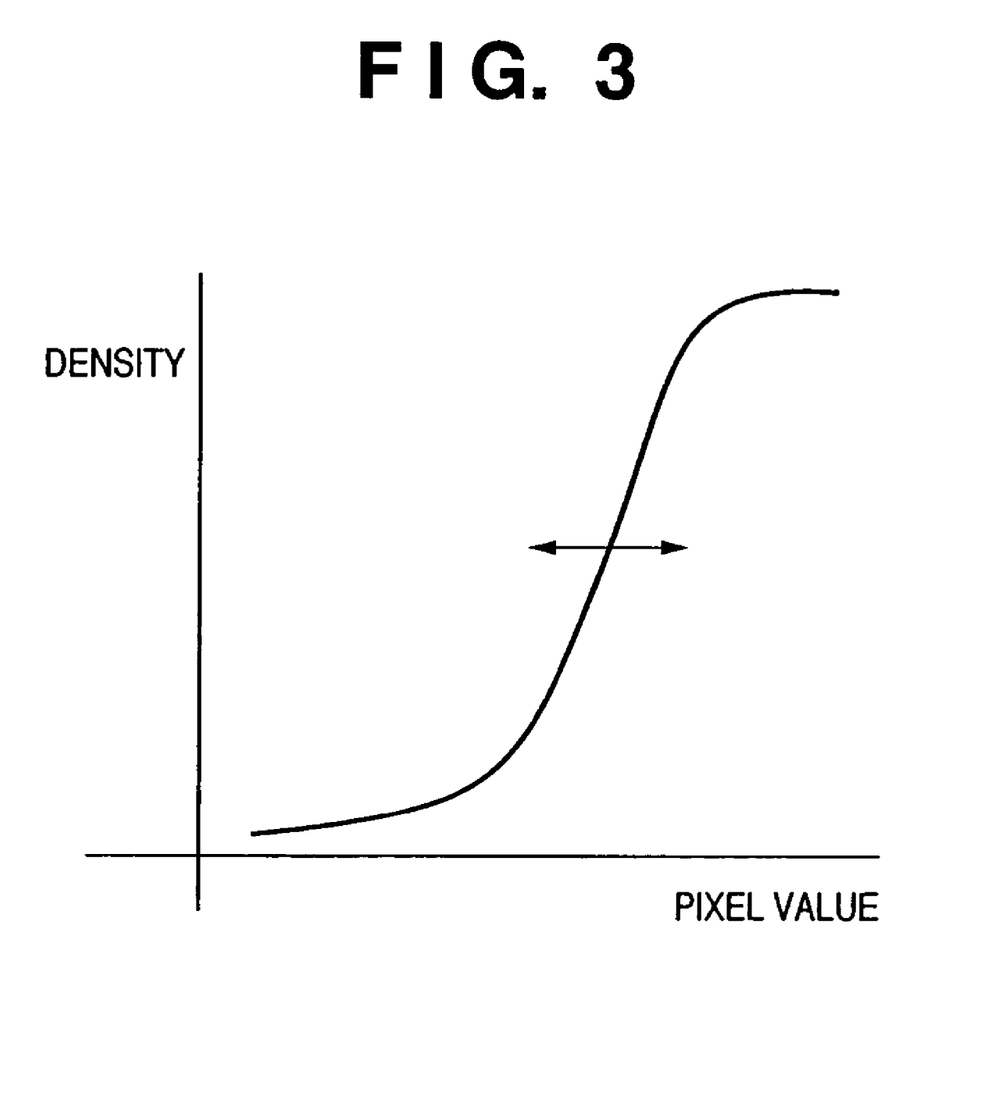
FIG. 3 is a graph showing an example of a grayscale conversion curve.

FIG. 3 shows an example of a grayscale conversion curve in the grayscale conversion circuit 116. The abscissa represents the pixel value of an image; and ordinate, the density after grayscale conversion (which may be the luminance or the like depending on the form of image output, as described above). Note that the grayscale conversion curve (conversion characteristic) in the grayscale conversion circuit 116 is changed on the basis of the feature amount calculated by the feature amount calculation circuit 114 so as to present a tumor portion at a proper density and contrast.

The X-ray imaging device 100 also includes a data acquisition circuit 105 connected to the preprocessing circuit 106, and a two-dimensional X-ray sensor 104 and X-ray generating circuit 101 which are connected to the data acquisition circuit 105. These circuits are also connected to the CPU bus 107.

In the above X-ray imaging device 100, the main memory 109 stores various data required for processing in the CPU 108 and the like, and includes a work memory for operation by the CPU 108. For example, the CPU 108 controls the operation of the overall apparatus by using the main memory 109 in accordance with the operation instructions input from the operation panel 110. With this control, the X-ray imaging device 100 operates as follows.

First of all, the X-ray generating circuit 101 emits an X-ray beam 102 to a subject 103 to be examined. The X-ray beam 102 emitted from the X-ray generating circuit 101 is transmitted through the subject 103 while being attenuated, reaches the two-dimensional X-ray sensor 104, and is output as an X-ray image from the two-dimensional X-ray sensor 104. Assume that in this case, the X-ray image output from the two-dimensional X-ray sensor 104 is a human body image.

The data acquisition circuit 105 converts the X-ray image output from the two-dimensional X-ray sensor 104 into an electrical signal and supplies it to the preprocessing circuit 106. The preprocessing circuit 106 performs preprocessing such as offset correction processing or gain correction processing with respect to the signal (X-ray image signal) from the data acquisition circuit 105. The X-ray image signal having undergone the preprocessing in the preprocessing circuit 106 is transferred as an original image to the main memory 109 and diagnosis support circuit 112 through the CPU bus 107 under the control of the CPU 108.

The diagnosis support circuit 112 extracts a tumor portion from the transferred image, and changes the grayscale conversion curve on the basis of the feature amount of the extracted tumor portion, thereby presenting the extracted tumor portion at a proper luminance (density) and contrast.

In displaying an X-ray image, the original image stored in the main memory 109 is supplied to the grayscale conversion circuit 116, and each pixel value is converted into a density signal in accordance with the properly changed grayscale conversion curve. By using the obtained density signals, an image is formed on a film or the like using a printer (not shown). Note that when the image display device 111 is to display the signal obtained by the grayscale conversion circuit 116, the grayscale conversion circuit 116 converts each pixel value into a luminance signal in accordance with the properly changed grayscale conversion curve.

Figure 2:
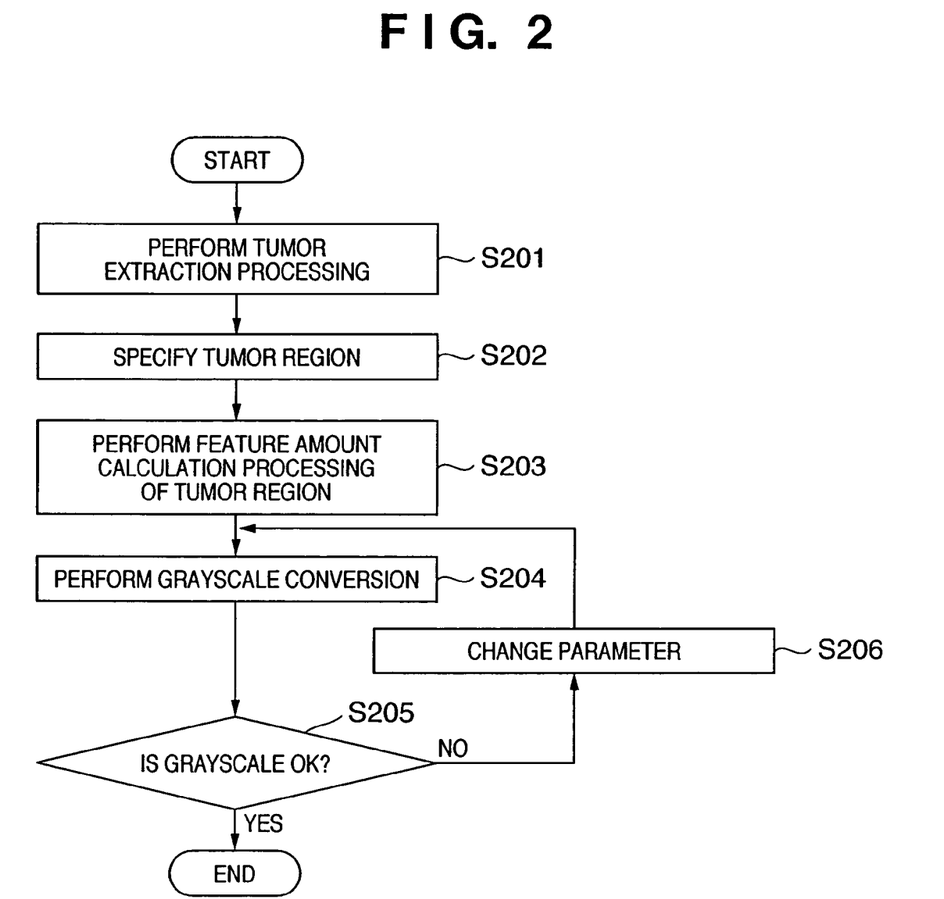
FIG. 2 is a flow chart showing a sequence for grayscale conversion setting processing by the image processing apparatus according to the first embodiment.

FIG. 2 is a flow chart showing the flow of processing in the diagnosis support circuit 112. The flow of processing in the diagnosis support circuit 112 will be described below with reference to the flow chart of FIG. 2.

First of all, the tumor extraction circuit 113 automatically extracts an isolated shadow (step S201). Isolated shadow extraction can be done by any known method. For example, the isolated shadow extraction method disclosed in U.S. Pat. No. 4,907,156 can be done. This method will be described briefly. First of all, a differential image between a tumor shadow enhanced image and a tumor shadow suppressed image is generated. Multiple threshold processing is performed for the generated differential image, and known labeling processing is performed, thereby calculating a feature amount such as a roundness from an isolated shadow having a value that is equal to or larger than a predetermined threshold and extracting an isolated shadow on the basis of the feature amount at the same time. The extracted isolated shadow is an image after labeling processing, and is expressed by, for example, a predetermined area and a corresponding number.

If, for example, a plurality of isolated shadows are extracted, the number assigned to each extracted isolated shadow in a corresponding region in the image is recorded as data (step S202).

The feature amount calculation circuit 114 calculates a feature amount for grayscale conversion from a region in the original image which corresponds to the isolated shadow extracted by the tumor extraction circuit 113. More specifically, the feature amount calculation circuit 114 calculates a pixel value average in a region in the original image which corresponds to the region obtained by the above labeling processing (S203). In this case, if only one isolated shadow is extracted, the average of the pixel values in the region of the isolated shadow is calculated. If a plurality of isolated shadows are extracted, a pixel value average in the regions of all the isolated shadows is calculated. Alternatively, as will be described later in the second embodiment (S403 in FIG. 6), the tumor likelihood degree of each isolated shadow is calculated, an isolated shadow which has the highest likelihood of being a tumor is selected, and the average of the pixel values in the region is calculated. Note that the determination circuit 115 determines whether one or a plurality of isolated shadows are extracted.

Figure 4A:
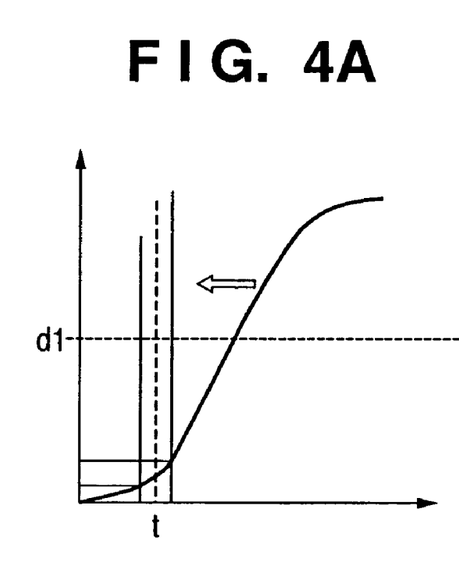
FIGS. 4A and 4B are graphs for explaining the processing of changing the grayscale conversion curve in the first embodiment.
Figure 4B:
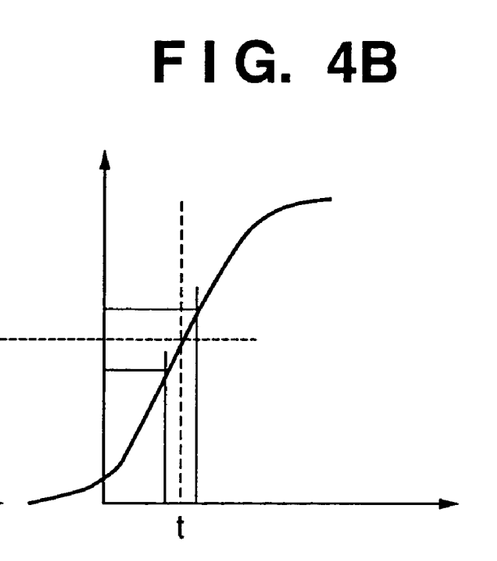

The grayscale conversion circuit 116 then changes the grayscale conversion curve on the basis of the feature amount calculated by the feature amount calculation circuit 114, as shown in FIGS. 4A and 4B. FIGS. 4A and 4B are graphs showing an example of the processing of changing the conversion curve, and how the grayscale conversion curve is horizontally shifted to the X-axis to make the tumor region have a constant density on a film (in practice, a table corresponding to the grayscale conversion curve is updated). In this case, shifting the grayscale conversion curve in the horizontal direction is equivalent to changing the density of an image on a film. The grayscale conversion curve is then shifted to change the density of the tumor region so as to set a density and contrast which allow easiest observation (step S204).

Assume that the conversion characteristic of the grayscale conversion circuit 116 has a grayscale conversion curve like that shown in FIG. 4A, the density value which allows easy observation is represented by d1, and the calculated feature amount of an isolated shadow is represented by t (in this case, the average of the pixel values in the region of the isolated shadow). In this case, the grayscale conversion curve is moved as shown in FIG. 4B. That is, the conversion curve is shifted to match the density value at the calculated feature amount t with the density value d1 which allows easy observation of the tumor. As a result, the isolated shadow is displayed near the density which allows easy observation. In addition, the density range near the feature amount t expands, and hence high contrast can be obtained in the tumor region.

In addition, the description about the above grayscale conversion can be applied to the grayscale conversion of a CRT by replacing "density" with "luminance". In this case, if the observer is dissatisfied with the display luminance of the CRT, he/she can sequentially change the grayscale of the CRT by inputting a new parameter through the operation panel 110 (steps S205 and S206). In this case, for example, the user inputs a value corresponding to a luminance value, and the grayscale conversion circuit 116 changes the grayscale conversion curve to make the tumor shadow have that luminance value (for example, the grayscale conversion curve is moved in the horizontal direction).

Figure 5A:
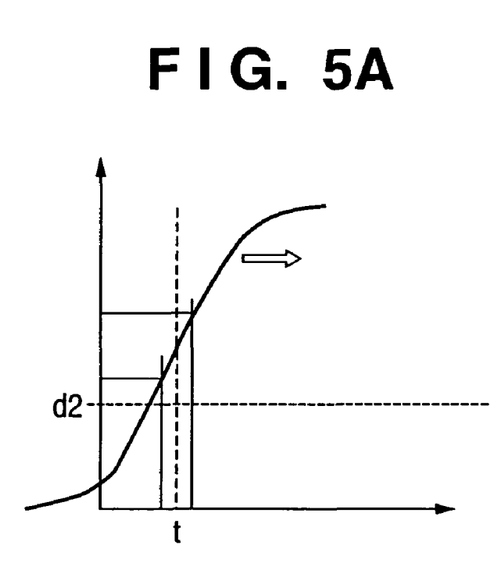
FIGS. 5A and 5B are graphs for explaining the processing of changing the grayscale conversion curve in the first embodiment.
Figure 5B:
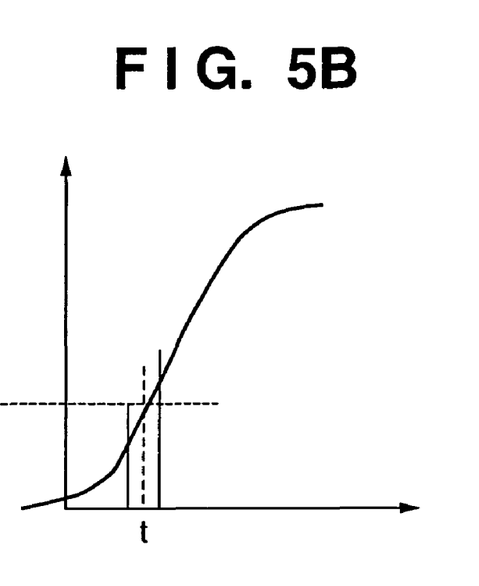

If, for example, a desired luminance value d2 is designated after the grayscale curve is automatically changed as shown in FIG. 5A, the grayscale conversion curve moves to match the luminance value at the calculated feature amount t with the designated luminance value d2.

As described above, according to the first embodiment, the isolated shadow extracted by the diagnosis support apparatus can be automatically displayed at a proper density and contrast. This facilitates observation of an isolated shadow which is located near a periphery of the lung or the like and difficult to observe, thus improving the diagnosis performance of the observer. This prevents overlooking of an isolated shadow, and hence can increase the efficiency of diagnosis. In addition, since this apparatus additionally has the function of manually changing the grayscale, the user can observe an isolated shadow at his/her favorite density and contrast.

Second Embodiment

In the second embodiment, when a tumor extraction circuit 113 extracts a plurality of isolated shadows, the respective isolated shadows are sequentially displayed on a image display device 111 while the conversion curve is sequentially changed to suit for each isolated shadow. The arrangement of a diagnosis support apparatus according to the second embodiment is the same as that of the first embodiment (FIG. 1), and hence a description thereof will be omitted. Grayscale conversion processing in the second embodiment will be described below.

Figure 6:
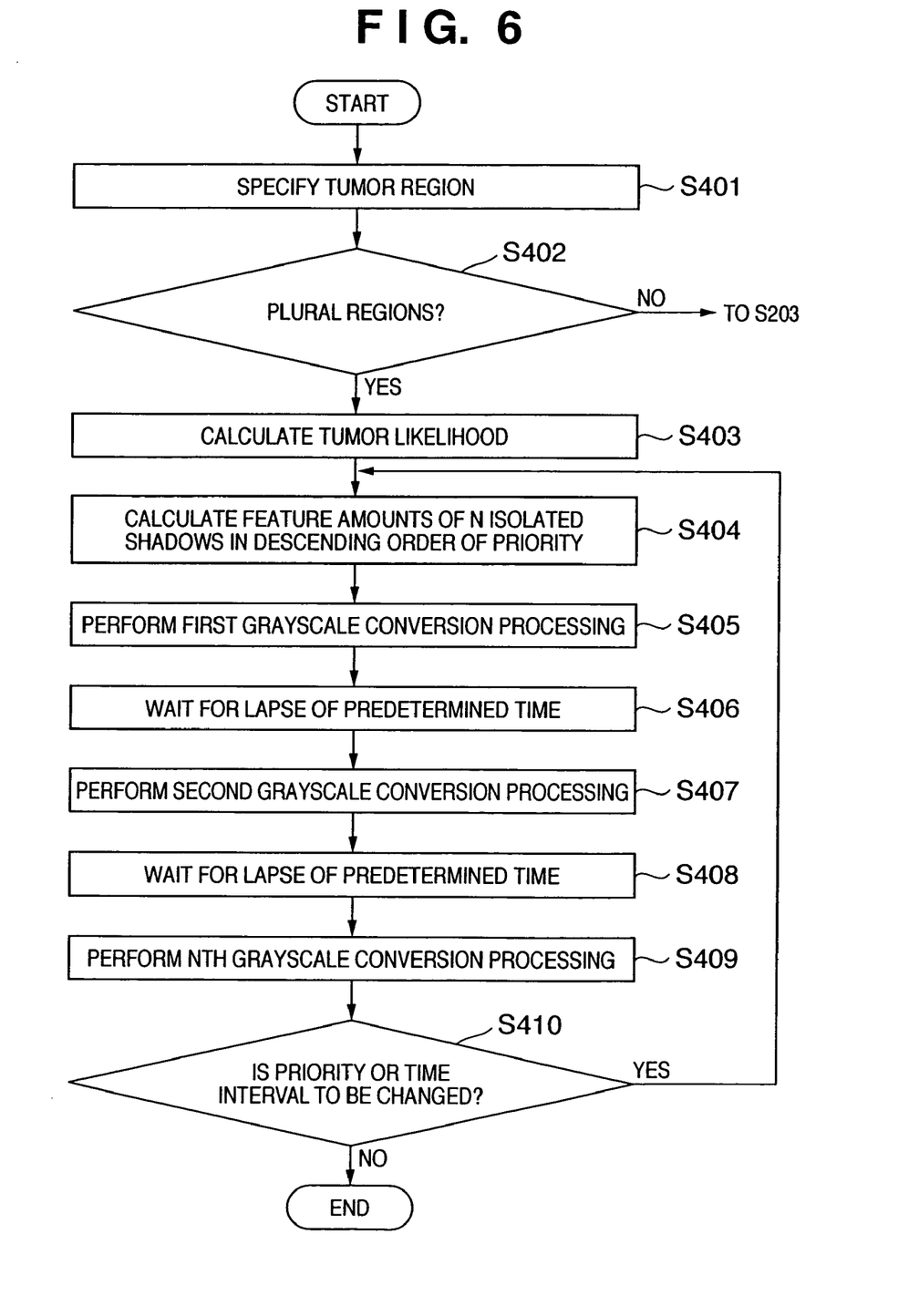
FIG. 6 is a flow chart showing a sequence for grayscale conversion setting processing by an image processing apparatus according to the second embodiment.

FIG. 6 is a flow chart for explaining the flow of processing in the second embodiment. As in steps S201 and S202 in the first embodiment, the tumor extraction circuit 113 extracts an isolated shadow and specifies a tumor region (step S401).

A determination circuit 115 determines whether or not the tumor extraction circuit 113 has extracted a plurality of isolated shadows (step S402). This determination is performed by determining whether or not a plurality of isolated shadows have been extracted by the labeling processing described above. If only one isolated shadow has been extracted, the processing described in the first embodiment (S203 to S206) is performed. If a plurality of isolated shadows have been extracted, the determination circuit 115 calculates the tumor likelihood degree of each isolated shadow extracted by the tumor extraction circuit 113 (step 403).

For example, an area S of each extracted isolated shadow is calculated from the above labeling region, and a radius R of a circle having the same area as the calculated area S is obtained. In addition, a length L of the outer circumference of the extracted isolated shadow region is obtained. Letting C be the outer circumference of the circle having the radius R (i.e., $C=2\pi R$), $\alpha$ be the heteromorphism degree obtained by subtracting the ratio between the length of the outer circumference and the outer circumference from 1, i.e., $1-C/L$. Also, letting A be the area of the isolated shadow within the radius R from the center of gravity of the isolated shadow, and S be the area of the isolated shadow, a roundness $\beta=A/S$ is calculated. These values $\alpha$ and $\beta$ are examples of indexes indicating tumor likelihoods. Assume that as the roundness $\beta$ increases, the tumor likelihood increases. This is because tumor shadows generally have circular shapes, whereas vomer shadows have long and narrow shapes. Likewise, as the heteromorphism degree $\alpha$ decreases, the tumor likelihood increases.

A feature amount calculation circuit 114 selects N isolated shadows of the isolated shadows determined by the determination circuit 115 in descending order of tumor likelihood, and calculates the feature amount of each isolated shadow (step S404). In this case, N represents the number of isolated shadows to be subjected to grayscale conversion, which is a preset integer. A grayscale conversion circuit 116 changes the grayscale conversion curve by the processing in step S405 and the subsequent steps using the feature amounts calculated by the feature amount calculation circuit 114 in descending order of tumor likelihood. That is, first of all, the grayscale conversion curve is changed on the basis of the feature amount corresponding to the isolated shadow with the highest tumor likelihood, and the original image is converted into a luminance signal by using this curve to be displayed on the CRT (step S405). After the lapse of a predetermined period of time, the grayscale conversion curve is changed on the basis of the feature amount of the isolated shadow exhibiting the second highest tumor likelihood, and the original image is converted into a luminance signal by using this curve to be displayed on the CRT (steps S406 and S407). In this manner, grayscale conversion is sequentially performed in descending order of tumor likelihood, and the image after grayscale conversion is displayed on the CRT or the like (from step S405 to step S409).

Note that the grayscale conversion of an image during display may be fixed by using the operation panel to be temporarily stopped so as to inhibit the flow of processing from progressing to the next grayscale conversion processing. In this case, the grayscale conversion circuit 116 temporarily stops grayscale conversion processing upon receiving an input signal (an operation signal indicating a pause instruction) from an operation panel 110. Furthermore, the flow of processing may shift to display processing based on an isolated shadow in the next place without waiting for a set time interval in accordance with a predetermined operation instruction. Alternatively, the flow of processing may shift to display processing based on an isolated shadow in the next place in accordance with only an operation instruction without setting any time interval.

In addition, a predetermined time interval for the progression to the next grayscale conversion and the number N of isolated shadows to be selected can be adjusted. In this case as well, the grayscale conversion circuit 116 changes internal parameters upon receiving an input signal from the operation panel 110 (step S410).

As described above, according to the second embodiment, when there are a plurality of isolated shadow candidates, all the isolated shadows can be easily diagnosed by performing grayscale conversion to make each isolated shadow have a proper density and contrast. In addition, since the display order of isolated shadows is determined on the basis of tumor likelihoods, the isolated shadows can be diagnosed in descending order of importance. Since the grayscale is sequentially converted to suit for the diagnosis of each isolated shadow, the diagnosis efficiency can be improved. Since a time interval for the progression to the next grayscale conversion can be changed, a diagnosis speed can be selected in accordance with diagnostician's preference. Furthermore, since the progression to the next grayscale conversion can be stopped, detailed diagnosis can be made. Moreover, since the priority of tumor likelihood can be changed, an unnecessary diagnosis time can be reduced, and the diagnosis efficiency can be improved.

Third Embodiment

In the second embodiment, when a plurality of isolated shadows exist, they are displayed while the grayscale is sequentially converted to suit for the respective isolated shadows. In the third embodiment, if a plurality of isolated shadows are extracted by a tumor extraction circuit 113, conversion characteristics suited for all the isolated shadows are generated to display them. The arrangement of a diagnosis support apparatus according to the third embodiment is the same as that of the first embodiment (FIG. 1). Image forming processing according to the third embodiment will be described below.

Figure 7:
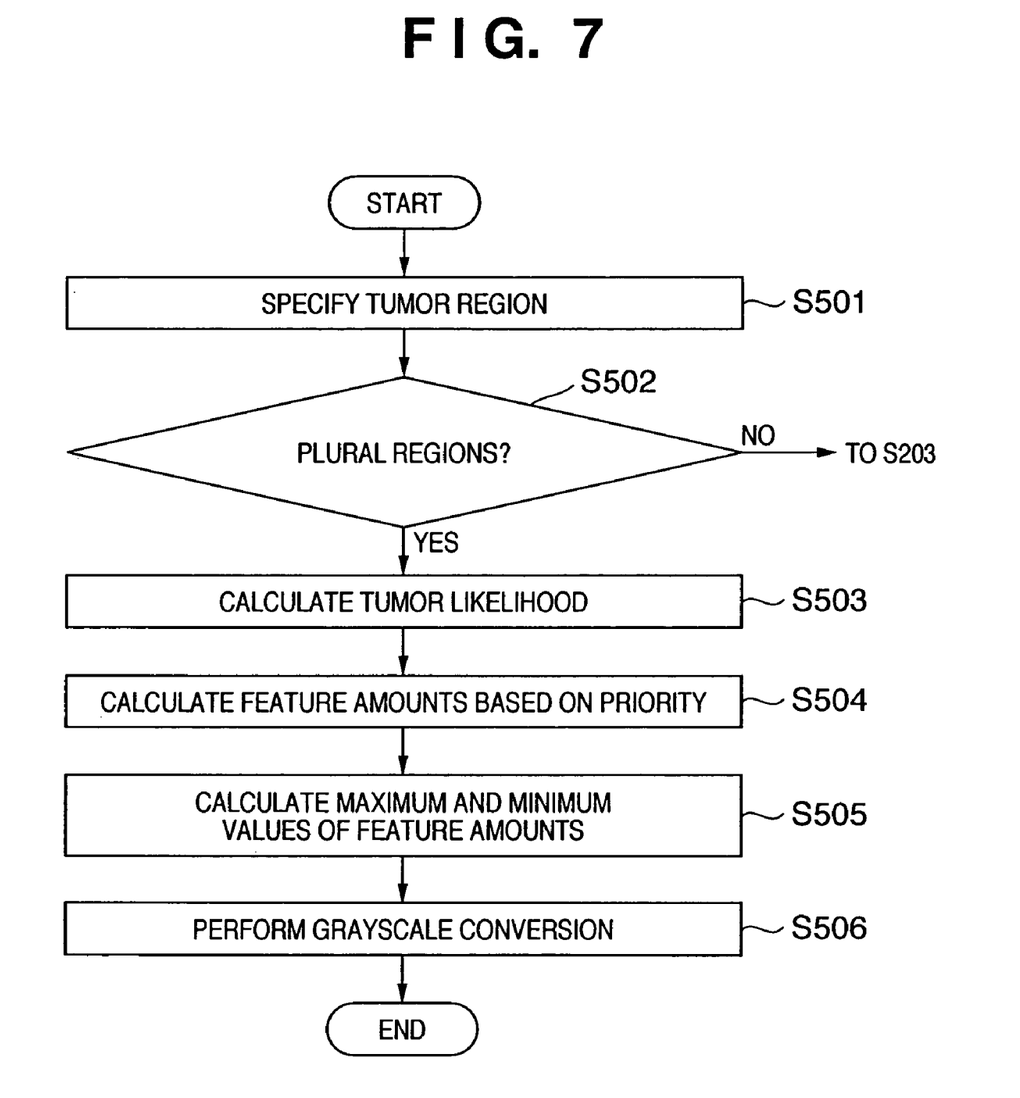
FIG. 7 is a flow chart showing a sequence for processing by an image processing apparatus according to the third embodiment.

FIG. 7 is a flow chart for explaining the flow of processing according to the third embodiment. As in steps S201 and S202 in the first embodiment, the tumor extraction circuit 113 extracts an isolated shadow and specifies a tumor region (step S501).

A determination circuit 115 determines whether or not a plurality of isolated shadows have been extracted by the tumor extraction circuit 113 (step S502). This determination is performed by determining whether or not a plurality of isolated shadows have been extracted by the labeling processing described above. If only one isolated shadow has been extracted, the processing described in the first embodiment (S203 to S206) is performed. If a plurality of isolated shadows have been extracted, the determination circuit 115 calculates the tumor likelihood degree of each isolated shadow extracted by the tumor extraction circuit 113 (step 503). The tumor likelihood degrees are calculated in the same manner as in the second embodiment (step S403).

A feature amount calculation circuit 114 selects N isolated shadows of the isolated shadows determined by the determination circuit 115 in descending order of tumor likelihood, and calculates the feature amount of each isolated shadow (step S504). That is, the feature amount calculation circuit 114 calculates the feature amounts of the N isolated shadows in descending order of priority. In this case, N represents the number of isolated shadows to be subjected to grayscale conversion, which is a preset integer. A grayscale conversion circuit 116 extracts maximum and minimum values from the N feature amounts calculated by the feature amount calculation circuit 114 (step S505). The grayscale conversion circuit 116 then performs grayscale conversion upon setting a grayscale characteristic to make the feature amounts exhibiting the maximum and minimum values become a predetermined density (step S506).

Figure 8:
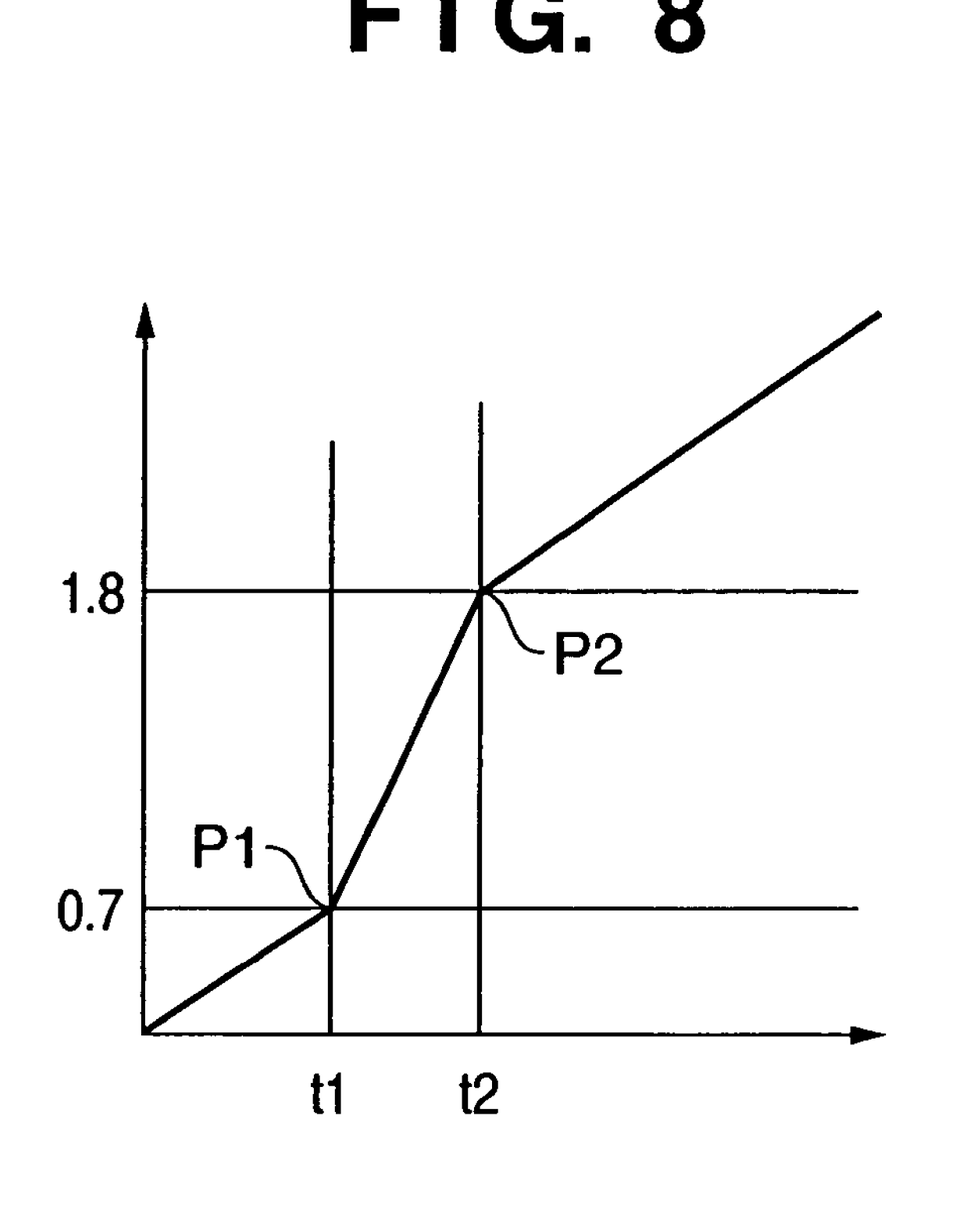
FIG. 8 is a graph showing an example of setting a grayscale conversion characteristic in the third embodiment.

Assume that the minimum and maximum values of the feature amounts are represented by t1 and t2, respectively, and a grayscale characteristic is set such that a density corresponding to the maximum value is 1.8, and a density corresponding to the minimum value is 0.7. In this case, a grayscale characteristic can be generated as shown in FIG. 8. That is, a grayscale characteristic is formed by a straight line connecting the origin and P1, a straight line connecting P1 and P2, and a straight line connecting P2 and an end point (the coordinates of the maximum pixel value and maximum density value).

Note that this embodiment may allow adjustment of a priority N for tumor likelihood as in the second embodiment. In this case, the grayscale conversion circuit 116 changes internal parameters upon receiving an input signal from an operation panel 110.

As described above, according to the third embodiment, when there are a plurality of isolated shadow candidates, grayscale conversion is performed such that densities corresponding to the maximum and minimum values of feature amounts fall within a predetermined range. Even if there are a plurality of isolated shadows, all the isolated shadows can be simultaneously observed within the predetermined density range. This can improve the diagnosis performance. In addition, since the tumor likelihood priority can be limited, grayscale conversion can also be performed without being influenced by unnecessary isolated shadows.

In each embodiment described above, an average value (an average density or average luminance) is used as the feature amount of each isolated shadow. However, a mode or median can be used as a feature amount.

The object of the present invention is realized even by supplying a storage medium storing software program codes for realizing the functions of the above-described embodiments to a system or apparatus, and causing the computer (or the CPU or MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, hard disk, optical disk, magnetooptical disk, CD-ROM, CD-R, magnetic tape, nonvolatile memory card, ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present invention, a tumor shadow or the like extracted from an image can be presented at a proper density or luminance and proper contrast, thereby providing an image which facilitates diagnosis.

As many apparently widely different embodiments of the present invention can be made without departing from the spirit and scope thereof, it is to be understood that the invention is not limited to the specific embodiments thereof except as defined in the appended claims.

What is claimed is:
1. A diagnosis support apparatus comprising:
a processor programmed to execute;
an extraction unit configured to extract an isolated shadow as a candidate of a lesion from image data;

a first calculation unit configured to calculate feature amount of the isolated shadow extracted by said extraction unit;

a change unit configured to change a grayscale conversion characteristic based on the feature amount calculated by said first calculation unit;

a grayscale conversion processing unit configured to execute a grayscale conversion on the image data using the grayscale conversion characteristic changed by said change unit;

a determination unit configured to determine whether or not said extraction unit have extracted a plurality of isolated shadows;

a second calculation unit configured to calculate tumor likelihood degree of each of the plurality of isolated shadows if said determination unit determined that said extraction unit have extracted a plurality of isolated shadows; and a selection unit configured to select an isolated shadow from the plurality of isolated shadows in descending order of the tumor likelihood degree calculated by said second calculation unit, wherein said change unit, when it is determined by said determination unit that said extraction unit have extracted one isolated shadow, changes the grayscale characteristic based on the feature amount of the one isolated shadow without calculation by said second calculation unit; and said change unit, when it is determined by said determination unit that said extraction unit have extracted the plurality of isolated shadows, changes the grayscale characteristic in sequence based on the feature amount of the isolated shadow selected by said selection unit.

2. The apparatus according to claim 1, wherein said grayscale conversion processing unit defines the grayscale conversion curve such that an average pixel value in the selected isolated shadow becomes a predetermined value.

3. The apparatus according to claim 1, further comprising a setting unit configured to set the number of isolated shadows to be selected by said selection unit.

4. The apparatus according to claim 1, further comprising a display unit configured to display the image data converted by said grayscale conversion processing unit.

5. The apparatus according to claim 4, wherein said selection unit sequentially selects a predetermined number of isolated shadows in descending order of tumor likelihood degree at predetermined time intervals.

6. The apparatus according to claim 5, further comprising a setting unit configured to set the predetermined time intervals.

7. The apparatus according to claim 5, further comprising an instructing unit configured to instruct said selection unit to temporarily stop selection of an isolated shadow in a next place.

8. The apparatus according to claim 1, wherein said grayscale conversion processing unit defines the grayscale conversion curve such that maximum values and minimum values of feature amounts of the predetermined number of isolated shadows which are calculated by said calculation unit become predetermined values respectively.

9. A method of forming a medical image comprising:

an extraction step of extracting an isolated shadow as a candidate of a lesion from image data;

a first calculation step of calculating feature amount of the isolated shadow extracted in said extraction step;

a change step of changing a grayscale conversion characteristic based on the feature amount calculated in said first calculation step;

a grayscale conversion processing step of executing a grayscale conversion on the image data using the grayscale conversion characteristic changed in said changing step a determination step of determining whether or not a plurality of isolated shadows have been extracted in said extraction step;

a second calculation step of calculating tumor likelihood degree of each of the plurality of isolated shadows if it is determined in said determination step that a plurality of isolated shadows have been extracted in said extraction step; and a selection step of selecting an isolated shadow from the plurality of isolated shadows in descending order of the tumor likelihood degree calculated in said second calculation step, wherein said change step, when it is determined in said determination step that one isolated shadow has been extracted in said extraction step, changes the grayscale characteristic based on the feature amount of the one isolated shadow without executing the second calculation step, and said change unit, when it is determined in said determination step that the plurality of isolated shadows have been extracted in said extraction step, changes the grayscale characteristic in sequence based on the feature amount of the isolated shadow selected in said selection step.

10. A non-transitory computer-readable storage medium storing a computer control program for causing a computer to execute an image forming method defined in claim 9.

* * * * *